United States Patent
Tzou

(10) Patent No.: US 8,189,702 B1
(45) Date of Patent: May 29, 2012

(54) SCATTERING-PARAMETER ESTIMATION METHOD AND TRANSCEIVER USING THE SAME

(75) Inventor: Ching-Kae Tzou, Hsinchu County (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 0 days.

(21) Appl. No.: 13/115,099

(22) Filed: May 24, 2011

Related U.S. Application Data

(60) Provisional application No. 61/416,307, filed on Nov. 23, 2010.

(51) Int. Cl.
*H04K 1/10* (2006.01)
*H04L 27/28* (2006.01)

(52) U.S. Cl. ........................... 375/260; 375/259
(58) Field of Classification Search ............ 375/260
See application file for complete search history.

(56) References Cited

U.S. PATENT DOCUMENTS

| | | | |
|---|---|---|---|
| 2002/0186760 A1* | 12/2002 | Bostoen et al. | 375/224 |
| 2005/0216213 A1* | 9/2005 | Sternberg et al. | 702/69 |
| 2008/0084940 A1* | 4/2008 | Hou | 375/260 |
| 2009/0245476 A1* | 10/2009 | Lindqvist | 379/32.04 |
| 2010/0035540 A1* | 2/2010 | Kim et al. | 455/3.04 |
| 2010/0226448 A1* | 9/2010 | Dent | 375/260 |
| 2011/0158361 A1* | 6/2011 | Dent et al. | 375/347 |
| 2011/0196634 A1* | 8/2011 | Kemp et al. | 702/65 |

* cited by examiner

*Primary Examiner* — David C. Payne
*Assistant Examiner* — Erin File
(74) *Attorney, Agent, or Firm* — Winston Hsu; Scott Margo

(57) ABSTRACT

The present invention discloses a scattering-parameter estimation method for a transceiver of a half-duplex multicarrier communication system. The scattering-parameter estimation method includes steps of converting a first frequency-domain transmit signal to generate at least one symbol period of the first time-domain transmit signal; transmitting the first time-domain signal in a first specific time period; receiving and storing at least one symbol period of the first echoed signal of the first time-domain transmit signal in the first specific time period; converting at least one symbol period of the first echoed signal into a first frequency-domain echoed signal after a first transmission period; and estimating the S11 parameters corresponding to carriers respectively according to the first transmit signal and the first echoed signal.

12 Claims, 2 Drawing Sheets

SCATTERING-PARAMETER ESTIMATION METHOD AND TRANSCEIVER USING THE SAME

CROSS-REFERENCE TO RELATED APPLICATIONS

This application claims the benefit of U.S. Provisional Application No. 61/416,307, filed on Nov. 23, 2010 and entitled "METHOD OF PARAMETER ESTIMATION FOR PLC", the contents of which are incorporated herein by reference.

BACKGROUND OF THE INVENTION

1. Field of the Invention

The present invention relates to a scattering-parameter estimation method and transceiver using the same, and more particularly, to a scattering-parameter parameter estimation method and transceiver using the same capable of cost-effectively estimating S11 parameters in a half-duplex multicarrier communication system.

2. Description of the Prior Art

Scattering parameters or S-parameters (the elements of a scattering matrix or S-matrix) describe the electrical behaviors of linear electrical network when undergoing various steady state stimuli by electrical signals.

Many electrical properties of network components may be expressed using these S-parameters, such as gain, return loss, or reflection coefficient. In the context of S-parameters, scattering refers to the way in which the traveling currents and voltages in a transmission line are affected when they meet a discontinuity caused by the insertion of a network into the transmission line. This is equivalent to the wave meeting an impedance differing from the line's characteristic impedance. For example, with respect to a communication device at one side of a link (or communication channel) with another communication device at the remote side of the same link, S11 is the input port voltage reflection coefficient, S12 is the reverse voltage gain, S21 is the forward voltage gain, and S22 is the output port voltage reflection coefficient.

In a typical power-line communication environment or channel, the S11 parameter is frequency dependent, i.e., the power-line typically has higher S11 values at some frequency components (carriers) and lower values at the others. For any signal transmitted to the power-line, more energy will be dissipated as thermal more at certain frequency components that have higher S11 values, and thus lower power is delivered to the remote side at these frequency components (i.e. lower S21). Therefore, if the signal spectrum on the line near the transmitter output is measured, power spectral density (PSD) notches can be observed, such that it is desirable for a transmission side to compensate the PSD notches according to S11 parameters over all frequency components.

According to current available standards like IEEE 1901 or G.hn (ITU-T G.9960) for power-line communication in home networking, a power line communication (PLC) device is a half-duplex multicarrier communication system, i.e. a typical cost-effective PLC transceiver can include only one processing module for either converting frequency-domain signals into time-domain signals via inverse fast Fourier transform (IFFT) during signal transmission or converting time-domain signals into frequency-domain signals via fast Fourier transform (FFT) during signal reception at different time slots. Although the S11 parameter calculation or estimation is well known in traditional communication or circuitry theory, there is still lack of a cost-effectively method for estimating S11 parameters in such half-duplex multicarrier communication device. Thus, there is a need for providing a cost-effectively method for estimating S11 parameters in the power line communication system.

SUMMARY OF THE INVENTION

It is therefore an objective of the present invention to provide a scattering-parameter estimation method and transceiver using the same capable of cost-effectively estimating S11 parameters in a half-duplex multicarrier communication system.

The present invention discloses a scattering-parameter estimation method for a transceiver of a half-duplex multicarrier communication system. The scattering-parameter estimation method includes steps of converting a first frequency-domain transmit signal to generate at least one symbol period of a first time-domain transmit signal; transmitting the time-domain transmit signal in a first specific time period; receiving and storing at least one symbol period of the first echoed signal corresponding to the first time-domain transmit signal; converting at least one symbol period of the first time-domain echoed signal into a first frequency-domain echoed signal after a first transmission period; and estimating the S11 parameters corresponding to carriers respectively according to the first transmit signal and the first echoed signal.

The present invention further discloses a transceiver for a half-duplex multicarrier communication system. The transceiver includes a processing module, for converting a first frequency-domain transmit signal to generate at least one symbol period of a first time-domain signal, to transmit the first time-domain signal in a first specific time period; and a memory, for receiving and storing at least one symbol period of first echoed signal of the first time-domain transmit signal in the first specific time period; wherein the processing module converts the first time-domain echoed signal into a first frequency-domain echoed signal after a first transmission period, and estimates the S11 parameters corresponding to carriers respectively in such multicarrier transceiver according to the first transmit signal and the first echoed signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
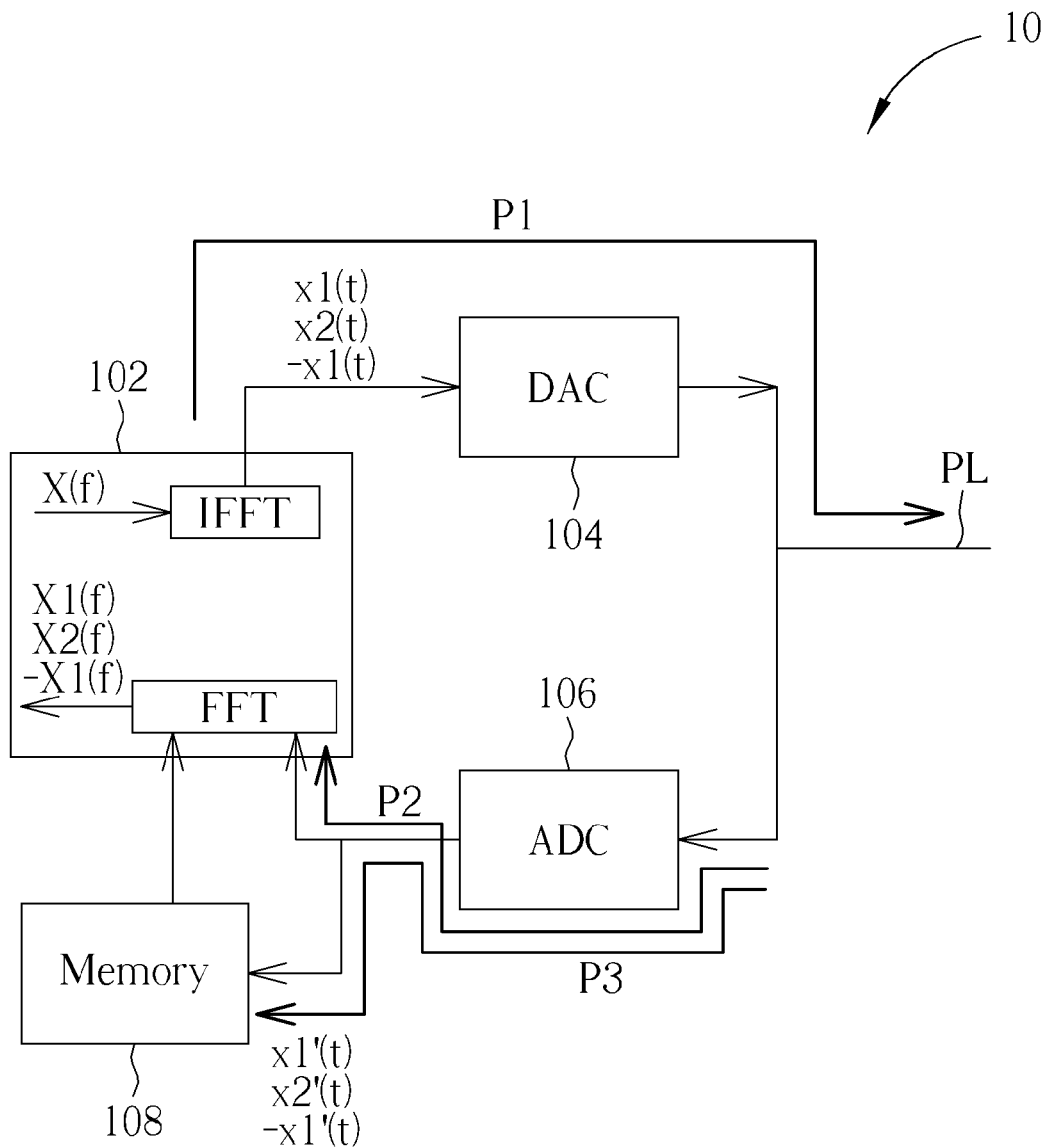
FIG. 1 is a schematic diagram of a transceiver according to an embodiment of the present invention.

Please refer to FIG. 1, which is a schematic diagram of a transceiver 10 according to an embodiment of the present invention. The transceiver 10 is preferably utilized in a power line communication (PLC) system, but can be utilized in other half-duplex multicarrier communication systems as well. The transceiver 10 includes a processing module 102, a digital to analog converter (DAC) 104, an analog to digital converter (ADC) 106 and a memory 108. In short, a main difference between the transceiver 10 and a conventional PLC transceiver is that the memory 108 is added in the transceiver 10. Under such a configuration, the transceiver 10 transmits signal to a power line PL while the memory 108 stores corresponding echoed signal at the same time, such that the processing module 102 can process the echoed signal after transmission, so as to estimate S11 parameters over all frequency components (carriers). As a result, the transceiver 10 cost-effectively estimates S11 parameters in a half-duplex multicarrier communication system by adding one memory 108.

In detail, a conventional PLC transceiver is a half-duplex multicarrier communication system, and includes only one processing module for either converting frequency-domain signals into time-domain signal via inverse fast Fourier transform (IFFT) during signal transmission (i.e. a path P1) or converting time-domain signals into frequency-domain signals via fast Fourier transform (FFT) during signal reception (i.e. a path P2) at different periods.

In comparison, in this embodiment of the present invention, during a transmission period TP1, the processing module 102 converts a frequency-domain transmit signal X(f) to generate at least one symbol period of time-domain signal x1(t), to transmit the signal x1(t) in a specific time period T1 (i.e. the path P1). Meanwhile, the memory 108 can receive and store at least one symbol period of echoed signal x1'(t) of the signal x1(t) in the specific time T1 (i.e. a path P3). Then, the processing module 102 converts the echoed signal x1'(t) into an frequency-domain echoed signal X1'(f) after the transmission period TP1, and estimates the S11 parameters corresponding to carriers respectively according to the transmit signal X(f) and the echoed signal X1'(f), e.g. comparing the echoed signal X1'(f) relative to the transmit signal X(f) on per tone basis or per tone group basis. As a result, the transceiver 10 can cost-effectively estimate S11 parameters by adding one memory module 108 to receive the at least one symbol period of echoed signal x1'(t) in the specific time T1.

Under such a situation, in order to compensate the PSD notches at frequency components with higher S11 values, higher transmit power can be allocated to these frequency components to compensate for the PSD notches. In other words, for some or all carriers, the processing module 102 can scale up the transmit power $P_{Tx}$ corresponding to a carrier in a subsequent transmission period according to the associated S11 parameter. For example, the processing module 102 scales up the transmit power $P_{Tx}$ of a tone in frequency-domain by a scaling factor which is a function of the S11 parameter (or other parameters) to reach a regulated power spectral density (PSD) mask $P_{lim}$ (e.g.

$$P_{Tx} = \frac{P_{lim}}{1 - |S11|}).$$

Therefore, signal transmitted to the power line PL can have a PSD as flat as possible in frequency domain and approximate to the regulated PSD mask $P_{lim}$, such that throughput at a receiving side is enhanced.

Noticeably, since it is likely that amplitude of some S11 parameters corresponding to some carriers are too high for the processing module 102 to cost-effectively scale up the transmit power $P_{Tx}$ of these carriers in frequency-domain, (e.g. if |S11|=0.9, $P_{Tx}$ needs to be scaled up by 10 times), the processing module 102 can then scale up the transmit power $P_{Tx}$ of these carriers by a predetermined value in the subsequent transmission period. In other words, if the amplitude of S11 parameter corresponding to a carrier is greater than a threshold value, set the scaling factor as the predetermined value for that carrier. As a result, the transceiver 10 can cost-effectively scale up the transmit power $P_{Tx}$ of carriers according to their associated S11 parameters, so as to enhance throughput.

Noticeably, the spirit of the present invention is to transmit signal and store corresponding echoed signal in the same time period, such that the processing module can convert the time-domain echoed signal into a frequency-domain echoed symbols after the transmission period and thus estimate S11 parameters. Therefore, the transceiver 10 for a half-duplex multicarrier communication can cost-effectively estimate the S11 parameters for some or all carriers by just adding one memory module 108. Those skilled in the art should make modification or alterations accordingly. For example, the memory 108 is preferably an FFT input buffer, but can be other types of internal or external memory as well. Besides, the transmission period TP1 can be greater than or equal to the specific time T1, i.e. the transceiver 10 may only store the echoed signal in some symbol periods during transmission.

Moreover, in order to improve quality of the estimated S11 parameter, during another transmission period TP2, the processing module 102 can convert the frequency-domain transmit symbol X(f) to generate at least one symbol period of time-domain signal x2(t), to transmit the signal x2(t) in a specific time period T2, where the signal x2(t) can be identical with or different from the first signal x1(t) if further processed. Meanwhile, the memory module 108 can receive and store at least one symbol period of echoed signal x2' (t) corresponding to the transmit signal x2(t) in the specific time period T2. Then, the processing module 102 converts the echoed signal x2' (t) into an frequency-domain echoed symbol X2' (f) after the transmission period TP2, and estimates the S11 parameters corresponding to carriers respectively according to the transmit signal X(f), the echoed signal X1'(f) and the echoed signal X2'(f), e.g. averaging the echoed signal X1' (f) and the echoed signal X2' (f), respectively, and comparing them relative to the transmit signal X(f) on per tone basis or per tone group basis. As a result, the transceiver 10 can perform operations of transmitting signal symbols and storing echoed signal symbols at different specific time periods, so as to accurately estimate S11 parameters by averaging or other types of signal processing.

On the other hand, the signal x1(t) can be different type of symbols for different applications. In one embodiment, during on-line S11 estimation, the at least one symbol x1(t) can be standard-compliant symbols transmitted to another transceiver, such as preamble symbols, control frame symbols, or data symbols recognized by other transceivers.

In another embodiment, during off-line S11 estimation, the signal x1(t) can be one or several predetermined symbols recognized by the transceiver 10 itself. Under such a situation, in order to eliminate un-ideal dc-bias component in a tone caused by the DAC 104, the ADC 106 and so on, i.e. X1'(f) containing a un-ideal dc-bias component, the processing module 102 can further inverse the signal x1(t) and transmit the signal −x1(t) in a specific time T3; meanwhile, the memory 108 can receive and store inversed and echoed signal −x1'(t) in the specific time T3; and then the processing module 102 converts the time-domain echoed signal −x1'(t) into a frequency-domain echoed signal −X1'(f) (also containing the un-ideal dc-bias component) after a transmission period TP3 and estimates the S11 parameters corresponding to carriers respectively according to the transmit signal X1(f), the echoed signal X1'(f) and the inversed echoed signal −X1'(f), e.g. the echoed signal X1'(f) minus the inversed echoed signal −X1'(f) can be divided by 2 and then compared relative to the transmit signal X(f) on per tone basis or per tone group basis.

As a result, the transceiver 10 can inverse the same symbols, and then transmit and store echoed symbols at another specific time during off-line S11 estimation, so as to accurately estimate S11 parameters by removing or reducing the unideal dc-bias component value in each carrier.

Figure 2:
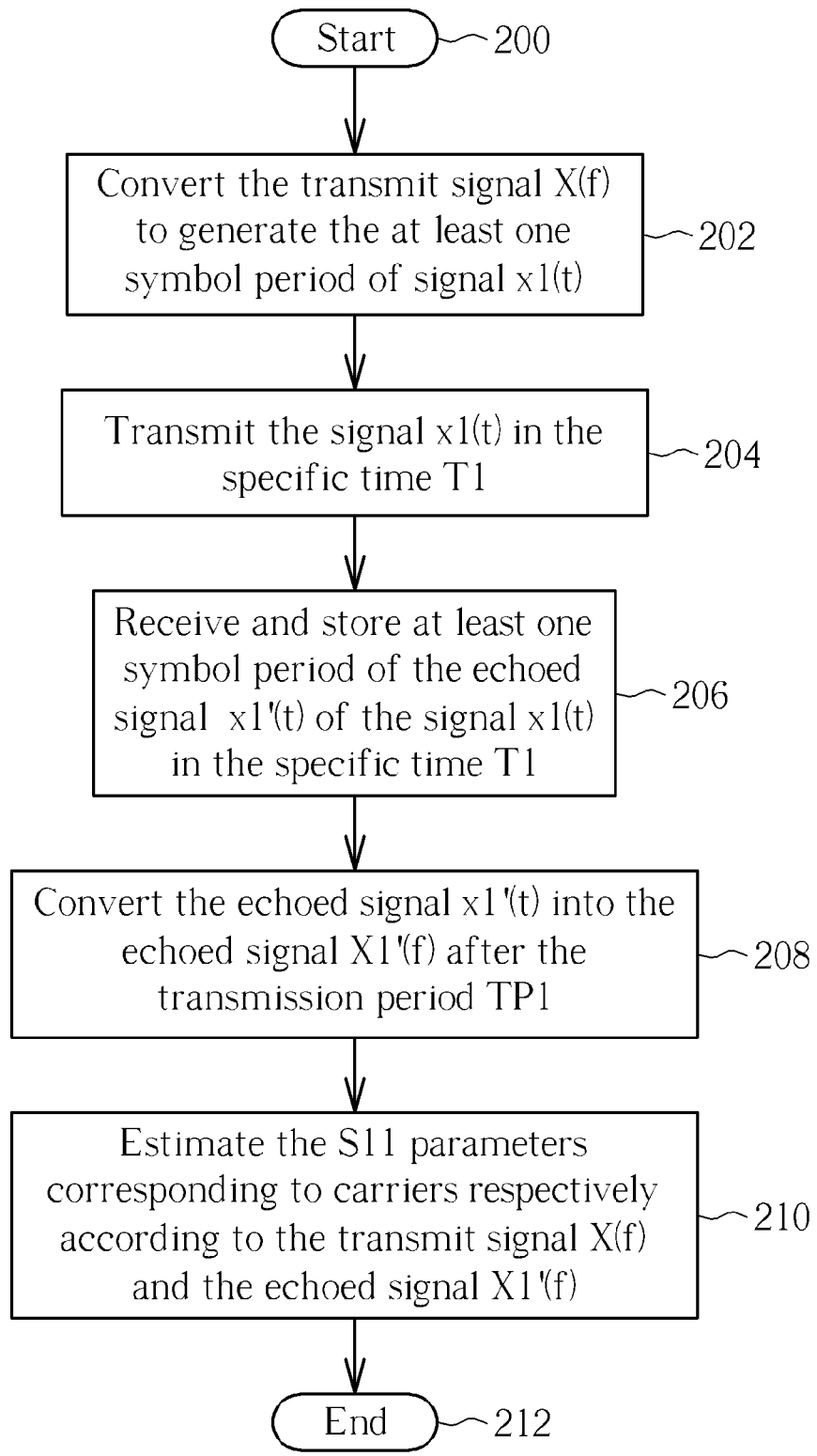
FIG. 2 is a schematic diagram of an S11 parameter estimation process according to an embodiment of the present invention.

The above operations of the transceiver 10 can be summarized into an S11 parameter estimation process 20 as shown in FIG. 2. The S11 parameter estimation process 20 includes the following steps:

Step 200: Start.

Step 202: Convert the transmit signal X(f) to generate the at least one symbol period of signal x1(t).

Step 204: Transmit the signal x1(t) in the specific time T1.

Step 206: Receive and store at least one symbol period of the echoed signal x1'(t) of the signal x1(t) in the specific time T1.

Step 208: Convert the echoed signal x1'(t) into the echoed signal X1'(f) after the transmission period TP1.

Step 210: Estimate the S11 parameters corresponding to carriers respectively according to the transmit signal X(f) and the echoed signal X1'(f).

Step 212: End.

Details of the S11 parameter estimation process 20 can be derived by referring to the above corresponding descriptions, and are noted narrated hereinafter.

In the prior art, since the power line communication (PLC) system is a half-duplex multicarrier communication system, there is still lack of a cost-effectively method for estimating S11 parameters. In comparison, the present invention can transmit signal symbols and store corresponding echoed signal symbols in the same time, such that the processing module can convert the time-domain echoed signal into a frequency-domain echoed signal after the transmission period and thus estimate S11 parameters. Therefore, the present invention can cost-effectively estimate S11 parameters by just adding one memory module.

Besides, the present invention can further perform operations of transmitting symbols and storing echoed symbols at different specific time periods, so as to accurately estimate S11 parameters by averaging or other types of signal processing. Moreover, the transceiver 10 can inverse the same signal symbols, and then transmit and store echoed signal symbols at another specific time during off-line S11 estimation, so as to accurately estimate S11 parameters by removing the unideal dc-bias component value in a tone caused by hardware circuitry or external components. Furthermore, the present invention can scale up transmit power according to the S11 parameters estimates, so as to enhance throughput.

To sum up, the present invention cost-effectively estimates S11 parameters in a half-duplex multicarrier communication system such as a PLC system by just adding one memory, so as to scale up transmit power and thus enhance throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scattering-parameter estimation method for a transceiver of a half-duplex multicarrier communication system, the scattering-parameter estimation method comprising:
converting a first transmit signal in frequency domain to generate at least one symbol period of the first time-domain signal;
transmitting the first time-domain signal in a first specific time;
receiving and storing at least one symbol period of the first echoed signal of the first time-domain signal in the first specific time;
converting the echoed signal into a first echoed frequency-domain signal after a first transmission period; and
estimating S11 parameters corresponding to carriers respectively according to the first transmit signal and the first echoed signal; and
scaling up the transmit power of carriers in a subsequent transmission period according to associated S11 parameters of the carriers;
wherein the S11 parameters are reflection coefficients of the transceiver.

2. The scattering-parameter estimation method of claim 1, wherein the step of scaling up the transmit power carriers in the subsequent transmission period according to their associated S11 parameters comprises:
scaling up the transmit power of a carrier by a predetermined value in the subsequent transmission period if the scaling up factor associated with the S11 parameter corresponding to that carrier is greater than a threshold value.

3. The scattering-parameter estimation method of claim 1 further comprising:
converting the first transmit signal to generate at least one symbol period of the second time-domain signal;
transmitting the second time-domain signal in a second specific time period;
receiving and storing at least one symbol period of the second echoed signal of the second transmit signal in the second specific time period;
converting at least one symbol period of the second echoed symbol into a second frequency-domain echoed signal after a second transmission period; and
estimating the S11 parameters corresponding to carriers respectively according to the first transmit signal, the first echoed signal and the second echoed signal.

4. The scattering-parameter estimation method of claim 1, wherein the first signal is composed of standard-compliant symbols transmitted to and recognized by another transceiver.

5. The scattering-parameter estimation method of claim 1, wherein the first signal is composed of predetermined symbols recognized by the transceiver.

6. The scattering-parameter estimation method of claim 5 further comprising:
inversing and transmitting the first signal in a third specific time period;
receiving and storing at least one symbol period of the inversed echoed signal of the inversed first signal in the third specific time period;
converting the inversed echoed signal into a inversed frequency-domain echoed signal after a third transmission period; and
estimating the S11 parameters corresponding to carriers respectively according to the first transmit signal, the first echoed signal and the inversed echoed signal.

7. A transceiver for a half-duplex multicarrier communication system, the transceiver comprising:
a processing module, for converting a first frequency-domain transmit signal to generate at least one symbol period of the first time-domain signal, to transmit the first time-domain signal in a first specific time period; and
a memory, for receiving and storing at least one symbol period of the first echoed signal of the first transmit signal in the first specific time period;

wherein the processing module converts at least one symbol period of first echoed signal into a first frequency-domain echoed signal after a first transmission period, estimates the S11 parameters corresponding to carriers respectively according to the first transmit signal and the first echoed signal, and scales up the transmit power of carriers in a subsequent transmission period according to associated S11 parameter estimates of the carriers;

wherein the S11 parameters are reflection coefficients of the transceiver.

8. The transceiver of claim 7, wherein the processing module scales up the transmit power of a carrier by a predetermined value in the subsequent transmission period if the scaling up factor determined by the associated S11 parameter and corresponding to the carrier is greater than a threshold value.

9. The transceiver of claim 7, wherein the processing module further converts the first transmit signal to generate at least one symbol period of a second time-domain signal, to transmit the second time-domain signal in a second specific time period; the memory receives and stores at least one symbol period of the second echoed signal of the second signal in the second specific time period; and then the processing module converts at least one symbol period of second echoed signal into a second frequency-domain echoed signal after a second transmission period and estimates the S11 parameters corresponding to carriers respectively according to the first transmit signal, the first echoed signal and the second echoed signal.

10. The transceiver of claim 7, wherein the first transmit signal is composed of standard-compliant-symbols transmitted to and recognized by another transceiver.

11. The transceiver of claim 7, wherein the first transmit signal is composed of predetermined symbols recognized by the transceiver.

12. The transceiver of claim 11, wherein the processing module further inverses and transmits at least one symbol period of the first signal in a third specific time period; the memory receives and stores at least one symbol period of inversed echoed signal of the inversed transmit signal in the third specific time period; and then the processing module converts the inversed echoed signal into a frequency-domain echoed signal after a third transmission period and estimates the S11 parameters corresponding to carriers respectively according to the first transmit signal, the first echoed signal and the inversed echoed signal.

* * * * *